April 22, 1930.  R. H. DIBLEY  1,755,817

INTERNAL COMBUSTION ENGINE

Filed April 30, 1927

INVENTOR
RAYMOND. H. DIBLEY.
BY
ATTORNEY

Patented Apr. 22, 1930

1,755,817

UNITED STATES PATENT OFFICE

RAYMOND H. DIBLEY, OF BATHURST, NEW SOUTH WALES, AUSTRALIA

INTERNAL-COMBUSTION ENGINE

Application filed April 30, 1927. Serial No. 187,941.

This invention relates to an engine and more particularly to the method of controlling the valve timing of an internal combustion engine.

The cam shaft or means for controlling the opening and closing of the intake and exhaust valves has been designed to cause certain conditions to exist in the combustion chamber which increase the power and efficiency throughout the entire speed range of the engine.

More specifically stated the invention consists in overlapping the intake and exhaust valves of a conventional single-carburetor engine at the upper end of the piston scavenging stroke over a greater range than heretofore believed possible.

It has been found that a depression in the combustion chamber exists, or may be made to exist by controlling the exhaust valve opening in the combustion chamber during the exhaust stroke, and that by opening the intake valve at the beginning or during this depression, combustible gases are drawn into the combustion chamber during the upward movement of the piston. It is therefore an important object of this invention to completely scavenge the combustion chamber before the downward movement of the piston for the intake stroke.

Another object of the invention is to balance the pressures at the intake valve, in the combustion chamber and at the exhaust valve such that exhaust gases drawn into the combustion chamber are materially reduced if not entirely eliminated during the exhaust stroke hereinafter more fully described.

Other objects and advantages will more fully appear from the following description taken in connection with the accompanying drawings, in which.

Figure 1:
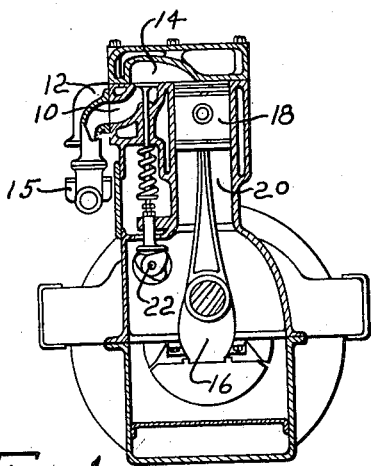
Fig. 1 is a sectional view thru an internal combustion engine.

The velocity of the reciprocating piston of an internal combustion engine varies thru its cycle of movement. The piston on its upward movement progressively increases its speed until it attains a position slightly above the center of its stroke, the amount of excess above the center of the stroke depending on the length of the connecting rod. Due to the rotating movement of the crankshaft the piston's velocity is retarded beyond center and the inertia of the exhaust gases thru the exhaust valve causes the volume of exhaust gas to continue beyond the piston causing a depression or subatmospheric pressure within the combustion chamber which draws exhaust gases back into the combustion chamber. The piston continuing its upward travel overcomes this depression by again building up a pressure within the chamber. Heretofore if any overlapping of the valves was made it was during this second compression period which caused a blowback of the exhaust gases into the intake passage. For this reason very slight overlapping of the intake and exhaust valves has been made.

I have found that by overlapping the intake and exhaust valves over a greater range at top dead center, the degree of which is dependent upon the motor design, having the intake valve open before or during the depression, a more stable and balanced condition is reached and better scavenging is obtained. Due to the ram action of the gas column in the intake manifold there is a certain pressure in the intake manifold at the valve and even assuming atmospheric pressure therein the depression or subatmospheric pressure in the combustion chamber draws in combustible gases before the piston has reached top dead center, thus balancing the pressure in the intake manifold with the pressure of the combustion chamber so that exhaust gases are not drawn back into the combustion chamber. The inertia of the exhaust gases being forced out positively causes the intake gases to enter thru the intake valve rather than exhaust gases thru the exhaust valve and by opening the intake valve during the depression the pressure in the chamber is equalized before the inertia of the exhaust gases is overcome. This balancing is accomplished by a combustible gas rather than a noncombustible gas and after the pressure is balanced in the combustion chamber that pressure balances exhaust pressure thus preventing their return into the combustion chamber. The final upward movement of the piston, which at this point is short and comparatively slow, further balances the pressure in the combustion chamber with the exhaust and intake manifolds. The pressure is thus balanced in the combustion chamber, intake manifold and exhaust manifold by a combustible gas rather than by the biproducts of combustion from the exhaust line.

The contraction of the exhaust gases in the exhaust passage added to the small inertia at idle or slow speeds creates the depression at approximately the same place as at high speeds with greater inertia and relatively small contraction.

The above description is ideal for open throttle conditions due to the ram pressures in the intake manifold readily balancing the low pressures in the combustion chamber, but for closed throttle conditions a subatmospheric pressure condition exists which does not readily balance and to overcome this condition the overlapping period is decreased, that is the intake valve opens shortly after the depression has been reached but before it ceases. During the overlapping period the intake valve area is comparatively larger than the exhaust valve and the intake valve opens quickly while the exhaust valve partially closes quickly within certain limits, completely closing slowly so that pressure conditions are compensated for at slow and high speeds.

I am aware that some overlapping of the intake and exhaust valves has been made but due to the assumption of a continuous pressure in the exhaust passage and a relatively low pressure in the intake manifold, the overlapping of the valves has been slight to prevent a blow back thru the intake passage. It is true that slight overlapping causes a blow back and that by increasing the overlap the blow back is increased but the latter is only true for a certain number of degrees. When the intake valve opens at the time of the depression and pressures are equalized and there is no blow back after the pressures have been equalized.

The opening of the exhaust valve has a bearing on the opening of the intake valve because by varying the opening of the exhaust valve the inertia of the exhaust gases are varied and consequently the depression period.

By increasing the overlapping range such as by advancing the intake opening a much more quiet cam may be designed. The flank radius may be decreased about one-half maintaining the same length lift and yet a wider nose. It is true that the smaller flank radius decreases the power efficiency but with the increased power given by the overlapping of the valves and the wider cam nose such loss of power may be sacrificed for quietness in operation.

Referring to the drawings wherein one form of my invention has been illustrated, I have shown a conventional engine having an inlet manifold 10, exhaust manifold 12, combustion chamber 14 and carburetor 15. A crankshaft 16 reciprocates a piston 18 in a cylinder 20 and a camshaft 22, conventionally driven by the crankshaft 16 is adapted, thru suitable conventional valve mechanism, to open and close the inlet and exhaust valves. It is to be understood that while only the intake valve has been shown the exhaust valve leading to the exhaust manifold 12 is in line with the intake valve and for all purposes practically the same.

Figure 2:
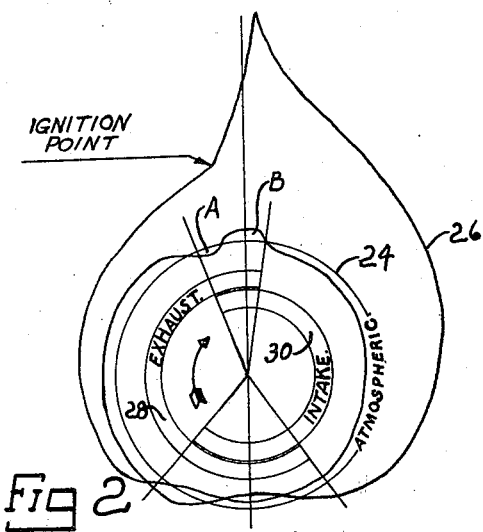
Fig. 2 is a diagrammatic view illustrating the opening and closing of the intake and exhaust valves and the pressures in the combustion chamber during two complete revolutions of the crankshaft.

Referring to Fig. 2 a complete cycle or two revolutions of the crankshaft have been diagrammatically illustrated showing the overlapping of the valves and the pressures thruout a complete cycle. The circle 24 indicates atmospheric pressure and the portion of the line 26 outside the circle 24 indicates pressure above atmospheric pressure and the portion within the circle 24 indicates pressure below atmospheric pressure. The outer double circle 28 indicates the opening of the exhaust valve while the inner double circle 30 indicates the opening of the intake valve. At the point indicated at A, the depression above referred to occurs and at this point the intake valve opens whereupon the depression is filled with combustible gases thru the intake valve. B indicates the second compression period of the exhaust stroke.

Figure 3:
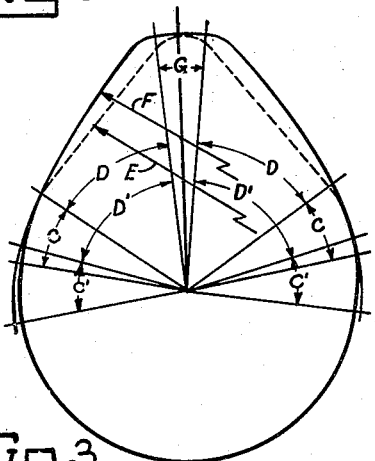
Fig. 3 is an enlarged view showing in detail the construction of the intake valve operating cam.
Figure 4:
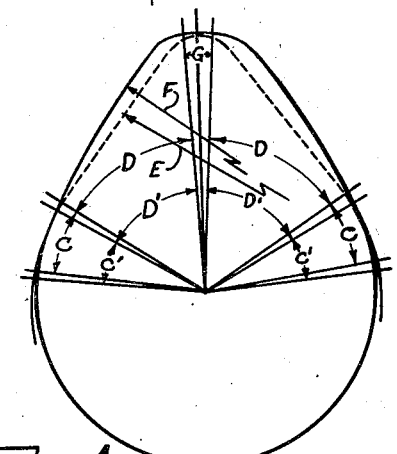
Fig. 4 is an enlarged view showing in detail the construction of the exhaust valve operating cam.

Figs. 3 and 4 illustrate respectively the construction of the intake cam and exhaust cam. The dotted lines illustrate the outline of a conventional cam and the full lines illustrate my improved cam. The cams may be considered as comprising a base circle portion, quieting zone, flank radius and nose. C indicates the quieting zone for the standard cam and C' the advanced zone. D indicates the valve lift including the flank radius and the nose radius of the standard cam while D' indicates the position of my new flank area and the nose radius. The arrow E indicates the large radius necessary for connecting the quieting zone with the nose radius on conventional constructions. It will be understood that as the quieting zone is advanced, as indicated by my new method, the point of intersection of tangent lines is extended thus permitting a smaller radius, indicated by arrow F, to intersect with the nose radius. Not only has the flank radius been reduced to give quieter operation but the nose may be spread as indicated at G. These advantages, gained by advancing the inlet opening, permit a quiet lift, and a valve which remains open longer than heretofore. The lines forming the included angle G are spread from the top dead center line to give the prolonged valve opening, the amount of which may be seen by the area of the figure formed by the outer full lines and the dotted lines.

Figure 5:
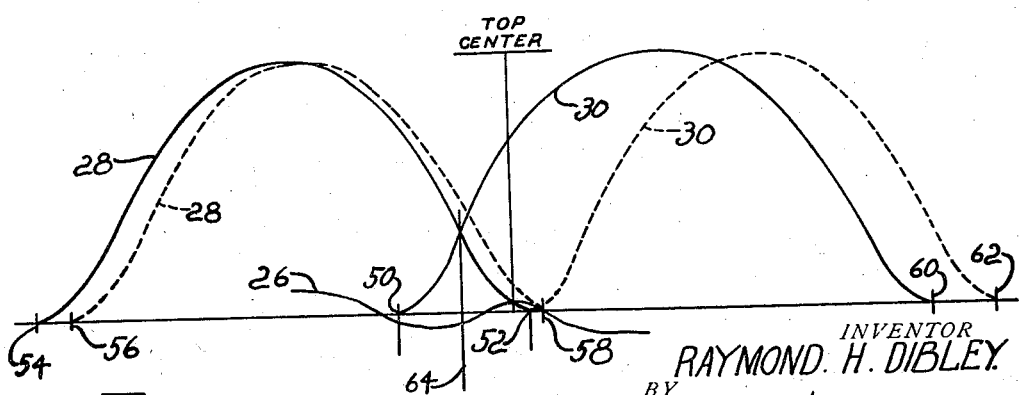
Fig. 5 is a diagrammatic view showing the relative operation of the conventional present type timing as compared to my new method.

In Fig. 5 the base line represents closed valve position, lines 28 and 30 the opening and closing of the exhaust and intake valves respectively of my improved valve timing method. The dotted lines indicate the valve timing of a conventional construction and the line 26 illustrates the pressure in the combustion chamber, using the base line to indicate atmospheric pressure. From this diagram it will be noted that the intake valve, line 30, opens at 50 slightly after the depression has started and that the exhaust valve, line 28, closes at 52 before the end of the second compression period. The usual practice heretofore has been to open the intake valve after the second depression period or slightly before the end of the second compression period as at 52. While the illustration may not be true of all constructions it is believed to be illustrative of the general idea of previous valve timing. The exhaust valve opening has been advanced as at 54, the old opening being at 56, and closes as at 52 as compared with the old closing point 58. The intake valve opens at 50 as compared to 52 and closes at 60 as compared to 62. It will be noted that the distance between 50 and 52 is greater than the distance between 60 and 62 showing the increase in time of opening of my method over the present practice. The line 64, thru the intersection of lines 28 and 30, indicates the point at which the valves are open the same amount illustrating the fact that the intake valve opens more quickly than the exhaust to assure more perfect idling conditions.

Thus far the invention has been explained generally illustrating the principle applicable to all engines but the following description is specific to one engine constructed in accordance with my invention and from which the following results have been obtained.

Naturally when a cam shaft is used to control the intake and exhaust valves. its design is the basis of the results obtained. It has been found that with the exhaust valve opening at about 48° before bottom center the depression period starts, or atmospheric pressure is attained at about 28° or 30° before top center and reaches its lowest pressure point at about 20°. From that point the pressure again builds up and goes above atmospheric at about 15° before top center. Heretofore it has been within these last 15° that the intake valve has been opened and the blow back has been very noticeable. At high speed the best results are obtained by opening the intake valve at the time atmospheric pressure is reached approximately 30° before top center but for slow speeds it has been found that a better idle may be obtained by opening the intake valve after that period or approximately 20°. This compensation is dependent upon engine design. The intake valve closes at 40° past bottom center.

Referring now to the cam design, the intake cam has a nose spread of 8°. The nose radius is .213″ and the flanke radius is 3.12″ as compared to 5.1″ on a standard cam having the same lift. The exhaust valve has a nose spread of 6°, its nose radius is the same as the intake cam and its flank radius is 3.12″ as compared to 4.3″ on a certain conventional cam. While the exhaust cam has not been modified to the same extent as the intake cam its flank radius has been considerably reduced thereby making a very quiet operating cam.

The included angle from the beginning of one flank radius to the end of the opposite flank radius, 2 D′ plus G, is approximately 128° as compared to 110° on the conventional cam. The quieting zone is approximately 30°. The flank radius, 3.12, has a proportion of 3 to 1 with the distance from the center of the camshaft to the top of the flank radius which is approximately one inch.

The base circle is approximately 172°. The cam 360°—(2 C′ 60° plus 2 D′, 120°, plus G, 8°) equals 172° or the base circle of the cam having a constant radius throughout the 172°.

What I claim is:

1. An internal combustion engine having intake and exhaust passages, a single carburetor adapted to supply combustible gases to said intake passages, valves for said intake and exhaust passages, a camshaft adapted to open said intake valves not less than 15° before top center on the scavenging stroke and adapted to close the exhaust valves after top center.

2. An internal combustion engine having intake and exhaust passages, a carburetor adapted to supply combustible gases to said intake passage, valves for said intake and exhaust passages, and a cam having a base circle portion of less than 180° and a valve lifting portion greater than 180° for opening said intake valve.

3. An internal combustion engine having intake and exhaust passages, a carburetor adapted to supply combustible gases to said intake passage, valves for said intake and exhaust passages, and a cam having a base circle of approximately 172°, two quieting zone portions of approximately 30° each, and the remaining portion of the cam formed of a pair of flank radii and a nose for operating said intake valve.

4. An internal combustion engine having intake and exhaust passages, a carburetor adapted to supply combustible gases to said intake passage, valves for said intake and exhaust passages, and a cam having a pair of equal flank radii and a nose included in an angle of approximately 128° for operating said intake valve.

5. An internal combustion engine having intake and exhaust passages, a carburetor adapted to supply combustible gases to said intake passage, valves for said intake and exhaust passages, and a cam having a pair of flanked radii and a nose, the distance from the center of the cam to the top of the nose being equal to approximately one third of either flank radius for operating said intake valve.

6. An internal combustion engine having intake and exhaust passages, a carburetor for supplying combustible gases to said intake passage, valves for said intake and exhaust passages, and a cam shaft having a cam for operating the intake valve and a cam for operating the exhaust valve, said cams being arranged in relation to each other so as to simultaneously retain said intake and exhaust valves open for a period not less than 20° rotation of said cams at the upper end of the scavenging stroke.

7. An internal combustion engine having intake and exhaust passages, a carburetor for supplying combustible gases to said intake passage, valves for said intake and exhaust passages, and a cam shaft having a cam arranged to open the intake valve at the upper end of the scavenging stroke before the second pressure period in the combustion chamber.

8. An internal combustion engine having intake and exhaust passages, a carburetor for supplying combustible gases to said intake passage, valves for said intake and exhaust passages, and a cam shaft having a cam for operating the intake valve and a cam for operating the exhaust valve, said cams being arranged in relation to each other so as to simultaneously retain said intake and exhaust valves open for a period of approximately 28° rotation of said cams at the upper end of the scavenging stroke.

RAYMOND H. DIBLEY.